(12) United States Patent
Amir et al.

(10) Patent No.: US 8,467,512 B2
(45) Date of Patent: Jun. 18, 2013

(54) METHOD AND SYSTEM FOR AUTHENTICATING TELEPHONE CALLERS AND AVOIDING UNWANTED CALLS

(75) Inventors: Arnon Amir, Saratoga, CA (US);
Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 12/512,347

(22) Filed: Jul. 30, 2009

(65) Prior Publication Data
US 2011/0026699 A1 Feb. 3, 2011

(51) Int. Cl.
*H04M 1/56* (2006.01)
(52) U.S. Cl.
USPC .................................. 379/142.05; 379/88.02
(58) Field of Classification Search
USPC ............................ 379/142.05, 88.02
See application file for complete search history.

(56) References Cited

U.S. PATENT DOCUMENTS

| | | | | |
|---|---|---|---|---|
| 5,434,906 A * | 7/1995 | Robinson et al. | ........... | 379/88.23 |
| 6,324,271 B1 * | 11/2001 | Sawyer et al. | ........... | 379/142.05 |
| 6,396,916 B2 * | 5/2002 | Jordan | ........... | 379/189 |
| 6,516,413 B1 * | 2/2003 | Aratani et al. | ........... | 713/170 |
| 6,553,110 B1 * | 4/2003 | Peng | ........... | 379/210.03 |
| 6,618,473 B1 | 9/2003 | Davis | | |
| 6,934,858 B2 * | 8/2005 | Woodhill | ........... | 726/5 |
| 7,167,728 B1 | 1/2007 | Wagner et al. | | |
| 7,206,572 B2 | 4/2007 | Luneau | | |
| 7,275,689 B2 * | 10/2007 | Mak | ........... | 235/384 |
| 7,370,349 B2 * | 5/2008 | Holvey et al. | ........... | 726/5 |
| 7,503,489 B2 * | 3/2009 | Heffez et al. | ........... | 235/382 |
| 8,060,413 B2 * | 11/2011 | Castell et al. | ........... | 705/26.1 |
| 2004/0131164 A1 | 7/2004 | Gould | | |
| 2005/0076246 A1 | 4/2005 | Singhal | | |
| 2005/0157860 A1 | 7/2005 | Schnarel et al. | | |
| 2006/0262929 A1 * | 11/2006 | Vatanen et al. | ........... | 380/255 |
| 2008/0189212 A1 * | 8/2008 | Kulakowski et al. | ........... | 705/50 |

OTHER PUBLICATIONS

WO 98/00956, Jordan, Jan. 1998.*

* cited by examiner

*Primary Examiner* — Simon Sing
(74) *Attorney, Agent, or Firm* — Shimokaji & Assoc., P.C.

(57) ABSTRACT

A service that handles incoming telephone calls without bothering the telephone subscriber is disclosed. The service permits a call to go through to a subscriber if the service determines that the call is not unwanted and the caller has been unauthenticated. The authentication is based on challenging the caller to prove its identity rather than relying on caller ID displays. Prospective callers pre-register with the service providing caller account information. When a caller is issued a challenge, the caller may prove its authenticity by supplying the challenge back to the service along with its registered information.

23 Claims, 3 Drawing Sheets

METHOD AND SYSTEM FOR AUTHENTICATING TELEPHONE CALLERS AND AVOIDING UNWANTED CALLS

BACKGROUND OF THE INVENTION

The invention relates generally to the field of consumer protection and more particularly, to protecting consumers from fraudulent solicitors employing telecommunications as a means of contact.

The unsolicited telephone call has become over many years an unwanted nuisance to some individuals. Where unsolicited telephone calls were, in some cases, merely an annoying interruption of daily life, the calls have become, for some, a more troubling and dangerous prospect. Unscrupulous entities have for some time taken to using the telephone and other forms of telecommunications as a means for scamming individuals out of important resources such as money and more contemporarily, out of one's identity.

One manner of combating against unsolicited calls involves using caller ID services provided by a telephone provider. Examples may be seen in U.S. Pat. No. 6,618,473 to Davis and U.S. Publication No. 2004/0131164 to Gould.

Unscrupulous entities may cheat a caller ID system by using techniques such as spoofing. Spoofing involves, in some instances, registering fake identities and telephone numbers with the caller ID service so that a spoofer's caller ID information fraudulently displays the origin of its calls. Some spoofers send hoax calls pretending to be legitimate entities, such as a targeted individual's bank, and convince the individual to provide sensitive information such as a social security number and bank account number.

As may be seen, there is a need for a system and method of screening out calls that employ authentication of the calls' origins.

SUMMARY OF THE INVENTION

A method of authenticating a source of a call from a caller to a recipient in a screening service comprises the steps of, generating a caller account with the service including registration of a caller identity and registration of a digital signature associated with the caller, recording the registered caller identity and the digital signature with an authenticator; intercepting the call by a screener; receiving a proposed caller identity by the screener from the caller during the call, including a phone number associated with the source of the caller, issuing a challenge by the screener to the caller, encrypting the issued challenge and the proposed caller identity by the caller using the digital signature, sending the encrypted challenge and the proposed caller identity from the caller to the authenticator, decrypting the encrypted challenge and the proposed caller identity at the authenticator and authenticating the source of the encrypted challenge by comparing the digital signature sent with the encrypted challenge against the digital signature registered in the caller account, forwarding the decrypted challenge and the proposed caller identity to the screener, verifying the decrypted challenge and the caller's registered caller identity match the issued challenge and the proposed caller identity received during the call, and passing the call to the recipient.

In another embodiment, a method of authenticating a source of a call from a caller to a recipient in a screening service includes, intercepting the call by a screener, receiving a caller identity by the screener from the caller, verifying that the caller is registered to a phone number shown in the caller identity, issuing a challenge by the screener to the caller and hanging up the call, sending a return phone call from the screener to the caller using the phone number shown in the caller identity, verifying that the caller is in possession of the challenge; and passing the caller to the recipient.

In still yet another embodiment, a computer-readable medium for authenticating a source of a communication from a sender to a recipient using a screening service includes, software instructions for generating a sender account sender registration service information with the service including registration of a sender identification, a sender communication address a sender public key and a sender private key, software instructions for storing the sender registration information with an authenticator; software instructions for intercepting the communication by using a screener; software instructions for receiving from the sender the sender identification and the sender communication address; software instructions for issuing an electronic challenge from the screener to the sender, software instructions for encrypting the electronic challenge using the sender private key, encrypted by the sender; software instructions for receiving the encrypted electronic challenge by the authenticator from the sender; software instructions for applying the registered sender public key to the sender private key of the encrypted electronic challenge to decrypt the encrypted electronic challenge, software instructions for blocking the communication if the step of applying the registered sender public key to the private key of the encrypted electronic challenge fails to decrypt the challenge, software instructions for forwarding the decrypted electronic challenge to the screener; software instructions for verifying with the screener the decrypted electronic challenge matches the challenge issued by the screener, and software instructions for routing the call to the recipient.

In still yet another embodiment, a system for authenticating a source of a telecommunication from a sender sent to a subscriber comprises a data bank for storing subscriber information and sender registration data, a screener in electronic intermediate communication between the sender and the subscriber for intercepting the telecommunication, issuing a challenge to the sender and forwarding authenticated telecommunications to the subscriber; an authenticator in electronic communication with the data bank and screener for authenticating the source of the telecommunication by comparing the sender registration data stored in the data bank to an encrypted message transmitted from the sender including the challenge issued by the screener and for forwarding an authentication status to the screener; and telecommunication lines for forming a telecommunication network between the sender, the screener, the authenticator, the data bank, and the subscriber.

These and other features, aspects and advantages of the present invention will become better understood with reference to the following drawings, description and claims.

DETAILED DESCRIPTION OF THE INVENTION

Figure 1:
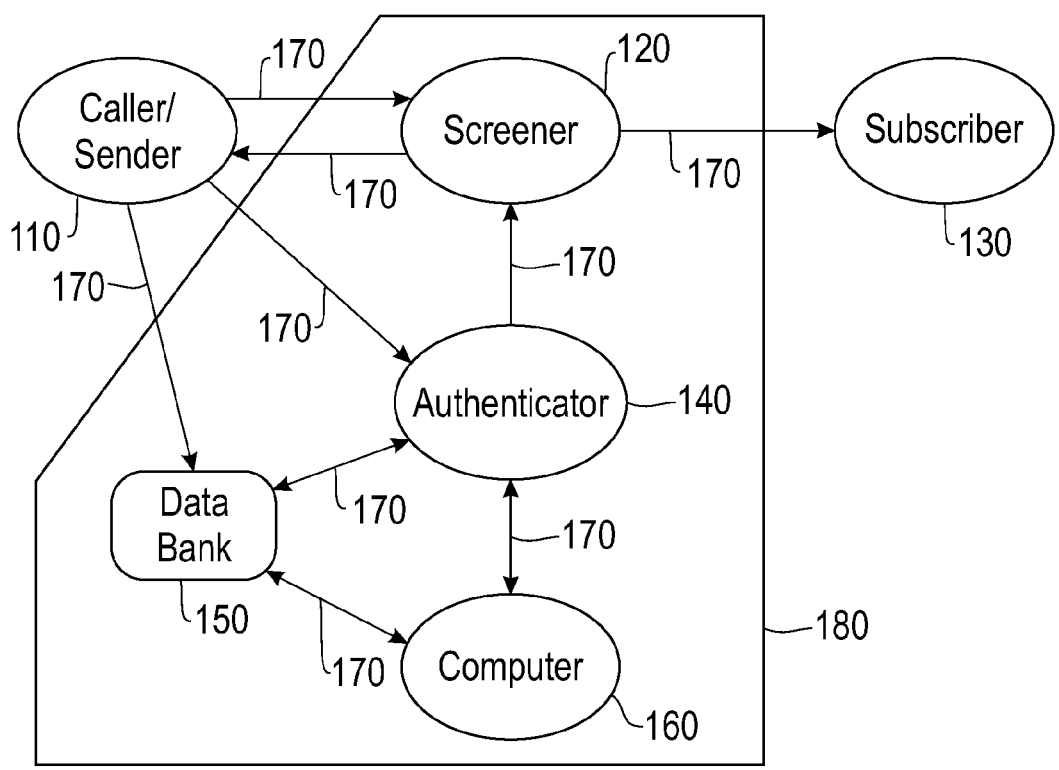
FIG. 1 is a schematic illustrating a system according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

In general, the invention may be employed as a service for screening out unauthorized solicitors in a telecommunication within either a commercial or personal setting or an interaction of the two. The invention may employ human-to-human interaction or utilize automation tools employing software to field communications between senders and recipients of messages. One exemplary use includes a service providing screening of impersonated hoax calls to private individuals where the service weeds out callers that spoof their caller identity with aims to impersonate a trusted business entity, such as a bank, and trick the private individuals out of personal information.

For illustrative purposes, one embodiment of the invention authenticates a caller identity displayed by a caller. One embodiment of the invention also may include using a screener that issues a challenge to a caller that the caller uses to respond to the service as proof of its identity. An embodiment of the invention may also include employing the use of a digital signature and an authenticator to verify a caller's identity by means of a voiced challenge and voice response from a secured center. For example, a caller may be requested to confirm its identity by sending a registered digital signature to the authenticator who may confirm if the caller satisfies criteria as a legitimate caller. A screener can then call the authenticator and receive the challenge back as a voiced proof of caller's authenticity. Additionally, one embodiment of the invention may use interaction by sending a return phone call to the caller using the phone number shown in the caller's identity.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may also take the form of a computer program product embodied in any tangible medium of expression having computer-usable program code embodied in the medium.

Any combination of one or more computer usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program may be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that may contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, and partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a service system 100 for authenticating a source of a telecommunication includes in general, a sender 110, a screener 120, a subscriber 130, and an authenticator 140 coupled to a data bank 150 and computer 160. Generally speaking, there are various ways an entity may reach out to another party and some individuals possess various devices for being reached. Thus, the service system 100 may provide a service applicable to various communication scenarios. In one embodiment, the service will screen a sender 110, which may be a telephone caller wishing to telephone a subscriber 130 on the subscriber's home telephone, business telephone, mobile phone or personal digital assistant (PDA). The screener 120 may be an individual or an automated screening function, which operates for instance, at a telephone-provider's hub. The authenticator 140 may also be an individual or similar to the screener 120 may be automated to access a data bank 150. The sender 110, screener 120, authenticator 140, data bank 150, computer 160 and subscriber 130 may all be interconnected using telecommunication lines 170. Additionally, the screener 120, authenticator 140, data bank 150, and computer 160 may be coupled together to form a network 180. In some embodiments, the screener 120 may incorporate the components of the authenticator 140, data bank 150, and computer 160 and perform the functions of both the screener and authenticator. The data bank 150 may hold information including sender or caller account information. In other embodiments, the subscriber can be the screener, issue the challenge and call the authenticator to receive it as a proof of caller's authentication.

In one exemplary embodiment, subscribers 130 may generate an account with the service system 100 that includes subscriber account information including a list of authorized entities which may communicate with the subscriber. Additionally, prospective callers/senders may generate an account with the service system 100, which includes registering the caller's or sender's identity. Additionally, an account may include the caller's phone number or sender's communication address. Registering an account may also include a showing of proof that the caller or sender is the entity it claims to be. For example, a business entity such as a bank that wishes to communicate with bank clients may register with the service system 100 upon a providing a business license number, a phone number, utility bills or other similar reliable evidence of identity. Registering callers/senders may also then be issued a public encryption key or digital signature for encoding communications sent between the caller/sender and the service system 100. The public encryption key or digital signature may also be associated with a private key during registration so that encrypted communications may be securely transmitted to the service system 100.

Figure 2:
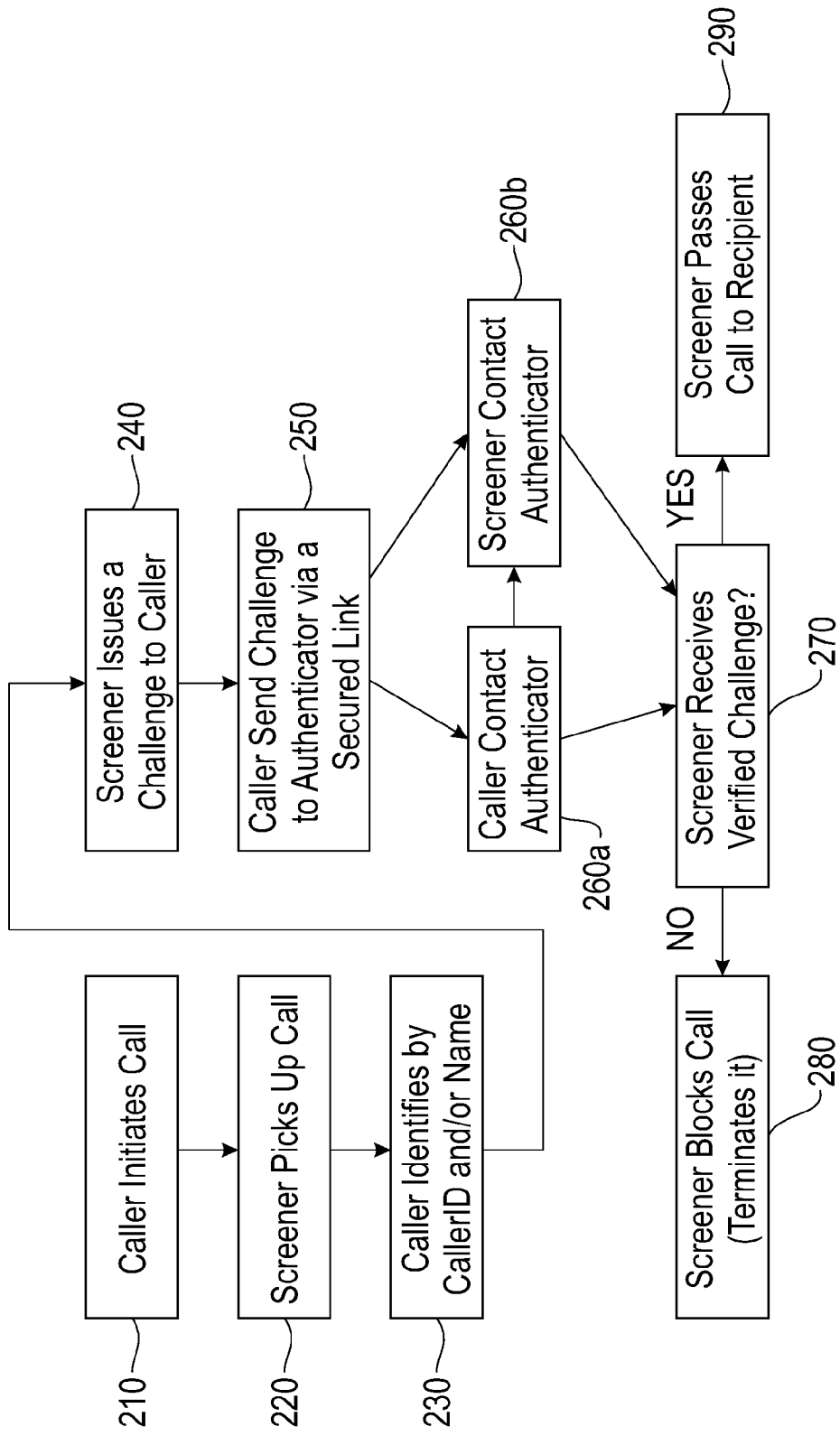
FIG. 2 is a flow chart depicting a series of steps employed according to one embodiment of the present invention shown in FIG. 1.

Thus, it will be appreciated that the service system 100 applies an interaction by obliging callers/senders to demonstrate proof of identity. Referring now to FIG. 2, one exemplary embodiment operates when a caller 110 initiates a call directed to a subscriber 130 (step 210). As the call is in transit to the subscriber 130, the screener 120 intercepts the call (step 220). The screener 120 may check for caller identification information including the source phone number of the call and/or request the caller to identify itself (step 230). Optionally, calls may be immediately dropped if they lack caller-identification information, the caller refuses to identify itself, or are not on the list of authorized callers the subscriber 130 has registered in its account.

The screener 120 may then issue a challenge to the caller 110 (step 240). Examples of a challenge may include an arbitrarily selected word, phrase, or number, presented during the call or a previously-designated identifier recorded during registration. The challenge may be presented verbally over the phone or sent to another registered location such as the caller's e-mail address or to a mobile phone capable of receiving short message system messages (SMS). During the process, a software agent may be employed to automate the service system 100 by performing functions such as intercepting the call, recognizing and requesting caller identification, issuing challenges, and forwarding the calls to the subscriber 130. Other functions of the software agent may include performing speech-synthesis and speech-recognition tools to interact with the caller 110. For example, the speech-synthesis tools may be used to issue the challenge during the phone call. In another example, the speech-recognition tools may be employed to recognize and retrieve caller account information from the authenticator 140 or data bank 150. Another embodiment may use the software agent to request the caller 110 use touch tone input of information and the software agent may include tools to retrieve call account information based on the inputted touch tones.

The call may then be put on hold while the caller 110 may, outside of the call, take the challenge, encrypt the challenge using a private key or attach the challenge in a message along with the caller's registered digital signature and send the encrypted challenge to the authenticator 140 through a secured telecommunication line 170 such as a website link (step 250). The caller 110 interfaces with the authenticator 140 (step 260*a*), presenting the encrypted challenge. The authenticator 140 may retrieve the caller's account information from the data bank 150. The authenticator 140 may, with the aid of computer 160, decrypt the challenge using a public key and/or compare the digital signature attached with the challenge to a digital signature registered with the caller's registration information. The authenticator 140 may perform all verifications or just decrypt the caller's 110 forwarded information. The screener 120 may then contact the authenticator 140 (step 260*b*) where the authenticator forwards to the screener unencrypted information including a proposed challenge, a caller identification and source phone number, and a digital signature.

The screener 120 may then verify the challenge received from the authenticator 140 matches the challenge issued to the caller 110 during the call (step 270). Optionally, the screener 120 may also verify that the caller identification and phone number received from the authenticator 140 match the caller identification and phone number displayed by the caller 110 during the call. If the challenge is not verified, the screener 120 may block the call from reaching the subscriber 130 and the call may be terminated (step 280). If the challenge is verified, the screener 120 may then pass the call on to the subscriber 130 (step 290).

Figure 3:
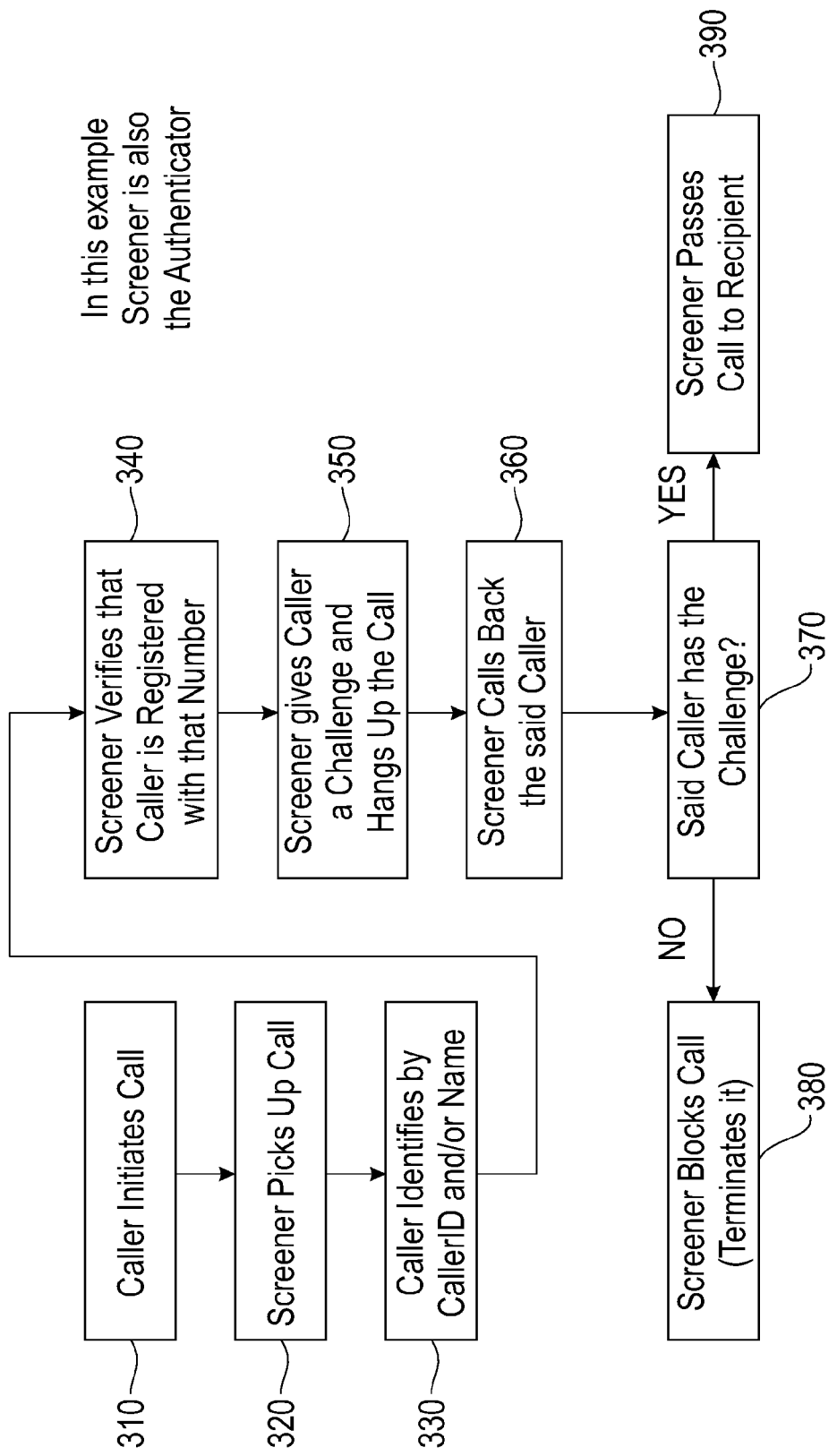
FIG. 3 is a flow chart depicting a series of steps employed according to another embodiment of the present invention shown in FIG. 1.

Referring to FIG. 3, another exemplary embodiment is similar to the one shown in FIG. 2 except that the call is interrupted after the challenge and the caller screener 120 may verify the source of the call by calling the caller 110 back. The process may commence when a caller 110 initiates a call directed to a subscriber 130 (step 310). As the call is in transit to the subscriber 130, the screener 120 intercepts the call (step 320). The screener 120 may check for caller identification information including the source phone number of the call displayed using caller ID tools (step 230). The screener 120 may request the caller to identify itself verbally and request the phone number from which it is calling from. The screener 120 verifies the phone number given by the caller 110 matches the phone number displayed on the caller ID and may also verify the phone number matches a number registered to the caller during account registration (step 340). Once again, a software agent may be employed to automate the service system 100 by performing functions such as intercepting the call, recognizing and requesting caller identification, issuing challenges, recognizing input by the caller, and forwarding the calls to the subscriber 130. Optionally, calls may be immediately dropped if they lack caller-identification information or the caller refuses to identify itself or is not on the list of authorized callers the subscriber 130 has registered in its account.

The screener 120 may then issue a challenge to the caller 110 (step 350). The challenge may, in one example, be given verbally. The screener 120 then hangs up the call (step 350) and calls the caller 110 back using the phone number supplied by the caller (step 360).

The screener 120 may then authenticate the caller 110 by verifying the caller answers from the same phone number previously supplied and verifying that the caller is in possession of the challenge (step 370). The challenge may be recognized using the speech-recognition software and the software agent may compare the caller's input of the challenge to the challenge issued by the screener 120. If the challenge is not verified, the screener 120 may block the call from reaching the subscriber 130 and the call may be terminated (step 380). If the challenge is verified, the screener 120 may then pass the call on to the subscriber 130 (step 390).

While the foregoing has been described primarily in the context of screening telephone calls, those skilled will understand that other forms of telecommunication may likewise benefit from the invention and thus, the invention may equally be applied thereto. For example, the invention may also be applied to e-mail messaging where the caller 110 may be substituted for an e-mail sender and the subscriber 130 is an e-mail recipient. Thus, the screener 120 intercepts e-mail messages from the sender 110 to the recipient 130. The sender 110 may register an e-mail account including a source communication address and the challenge can be sent to the e-mail account similarly as described in the foregoing. Similarly, the same may be applied to screening out text messages to one's mobile phone where a communication's sender may register with the service system 100 providing a source communication address before sending SMS messages to a subscriber 130's mobile phone.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special-purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

We claim:

1. A method of authenticating a source of a call from a caller to a recipient in a screening service, comprising:
    generating a caller account with the service including registration of a caller identity and registration of a digital signature associated with the caller;
    recording the registered caller identity and the digital signature with an authenticator;
    intercepting the call by a screener;
    receiving a proposed caller identity by the screener from the caller during the call including a phone number associated with the source of the caller;
    issuing a challenge by the screener to the caller;
    sending a return phone call from the screener to the caller using the phone number shown in the caller identity;
    verifying that the caller is in possession of the challenge;
    in response to verifying that the caller is in possession of the challenge, encrypting the issued challenge and the proposed caller identity by the caller using the digital signature;
    sending the encrypted challenge and the proposed caller identity from the caller to the authenticator;
    decrypting the encrypted challenge and the proposed caller identity at the authenticator and authenticating the source of the encrypted challenge by comparing the digital signature sent with the encrypted challenge against the digital signature registered in the caller account;
    forwarding the decrypted challenge and the proposed caller identity to the screener;
    verifying the decrypted challenge and the caller's registered caller identity match the issued challenge and the proposed caller identity received during the call; and
    passing the call to the recipient.

2. The method of authenticating a source of a call of claim 1, wherein the step of generating an account includes providing proof of the caller identity.

3. The method of authenticating a source of a call of claim 1, wherein the step of sending the encrypted challenge includes sending said challenge through a computer network to the authenticator.

4. The method of authenticating a source of a call of claim 1, wherein the step of issuing the challenge is done by sending a short message system message from the screener to the phone number associated with the source of the caller in the proposed caller identity.

5. The method of authenticating a source of a call of claim 1, wherein the screener also performs the steps of the authenticator.

6. The method of authenticating a source of a call of claim 1, wherein a subscriber performs the steps of the screener.

7. The method of authenticating a source of a call of claim 1, wherein the screener issues a verbal challenge of one or more words over a voice channel and the step of verifying the decrypted challenge comprises the screener calling the authenticator, listening to the voiced message and verifying the proposed caller identity with the challenge.

8. The method of authenticating a source of a call of claim 1, wherein the step of decrypting the challenge further includes verifying the proposed caller identity and the phone number associated with the source of the caller match the caller account.

9. The method of authenticating a source of a call of claim 1, wherein:
    the step of generating a caller account includes registering an e-mail address; and
    the step of issuing the challenge is sent via e-mail to the registered caller e-mail address.

10. The method of authenticating a source of a call of claim 1, wherein the challenge is issued from the screener to the caller using a speech synthesis.

11. The method of authenticating a source of a call of claim 1, wherein the step of receiving the caller identity utilizes a speech recognition software to identify the caller account.

12. The method of authenticating a source of a call of claim 1, wherein the step of forwarding the decrypted challenge and caller ID from the authenticator to the screener is performed using text messaging.

13. A method of authenticating a source of a call from a caller to a recipient in a screening service, including:
intercepting the call by a screener;
receiving a caller identity by the screener from the caller;
verifying that the caller is registered to a phone number shown in the caller identity;
issuing a challenge by the screener to the caller and hanging up the call;
sending a return phone call from the screener to the caller using the phone number shown in the caller identity;
verifying the caller is in possession of the challenge; and
passing the caller to the recipient.

14. The method of authenticating a source of a call of claim 13, wherein the step of receiving the caller identity includes asking the caller to identify itself and recognizing the caller identity using speech recognition software.

15. The method of authenticating a source of a call of claim 13, wherein;
the step of receiving the caller identity includes requesting the caller to use a touch tone input for inputting a call back number; and
the step of verifying the caller is registered to the phone number shown in the caller identity includes verifying the inputted call back number matches the phone number shown in the caller identity.

16. The method of authenticating a source of a call of claim 15, wherein the step of verifying the caller is registered to the phone number shown in the caller identity results in the inputted call back number not matching the phone number shown in the caller identity and dropping the call.

17. The method of authenticating a source of a call of claim 13, wherein:
the step of verifying the caller is in possession of the challenge includes a verbal input of the challenge by the caller during the return phone call;
the screener using a speech recognition software to recognize the verbal input of the challenge; and
a software agent for comparing the verbal input of the challenge with the challenge issued by the screener.

18. The method of authenticating a source of a call of claim 13, further comprising dropping the call if the call lacks a caller identity.

19. A tangible computer readable medium comprising computer-usable program code embodied therein for authenticating a source of a communication from a sender to a recipient using a screening service, the computer-usable program code being configured to:
generate a sender account sender registration service information with the service including registration of a sender identification, a sender communication address a sender public key and a sender private key;
store the sender registration information with an authenticator;
intercept the communication by using a screener;
receive from the sender the sender identification and the sender communication address;
issue an electronic challenge from the screener to the sender;
send a return phone call from the screener to the sender verify the sender is in possession of the challenge;
in response to verifying that the sender is in possession of the challenge, encrypt the electronic challenge using the sender private key, encrypted by the sender;
receive the encrypted electronic challenge by the authenticator from the sender;
apply the registered sender public key to the sender private key of the encrypted electronic challenge to decrypt the encrypted electronic challenge;
block the communication if the step of applying the registered sender public key to the private key of the encrypted electronic challenge fails to decrypt the challenge;
forward the decrypted electronic challenge to the screener;
verify with the screener the decrypted electronic challenge matches the challenge issued by the screener; and
route the call to the recipient.

20. A system for authenticating a source of a telecommunication from a sender sent to a subscriber, comprising:
a data bank configured to store subscriber information and sender registration data;
a screener in electronic intermediate communication between the sender and the subscriber for intercepting the telecommunication, issuing a challenge to the sender and forwarding authenticated telecommunications to the subscriber, wherein the screener is configured to send a return phone call from the subscriber to the sender and verify that the sender is in possession of the challenge;
an authenticator in electronic communication with the data bank and screener configured to, in response to verifying that the sender is in possession of the challenge, authenticate the source of the telecommunication by comparing the sender registration data stored in the data bank to an encrypted message transmitted from the sender including the challenge issued by the screener and for forwarding an authentication status to the screener; and
telecommunication lines configured to a telecommunication network between the sender, the screener, the authenticator, the data bank, and the subscriber.

21. The system for authenticating a source of a telecommunication of claim 20, wherein the screener includes a computer incorporating a software agent for automating the interception of the telecommunication, the issuance of the challenge, and the forwarding of authenticated telecommunications to the subscriber.

22. The system for authenticating a source of a telecommunication of claim 21, wherein the software agent includes a short message system service for issuing the challenge over the telecommunication lines using a short message system protocol.

23. The system for authenticating a source of a telecommunication of claim 21, wherein the software agent includes an e-mail service for issuing the challenge over the telecommunication lines using an e-mail message.

* * * * *